July 15, 1941.    W. A. BLACK    2,248,942
POWER AMPLIFIER
Filed July 15, 1939    4 Sheets-Sheet 1
FIG. 6.
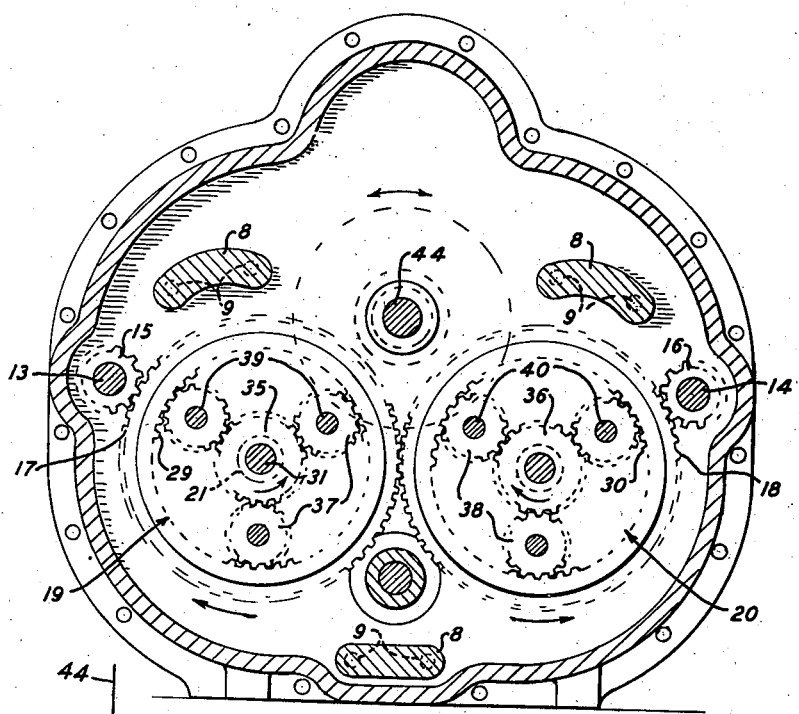
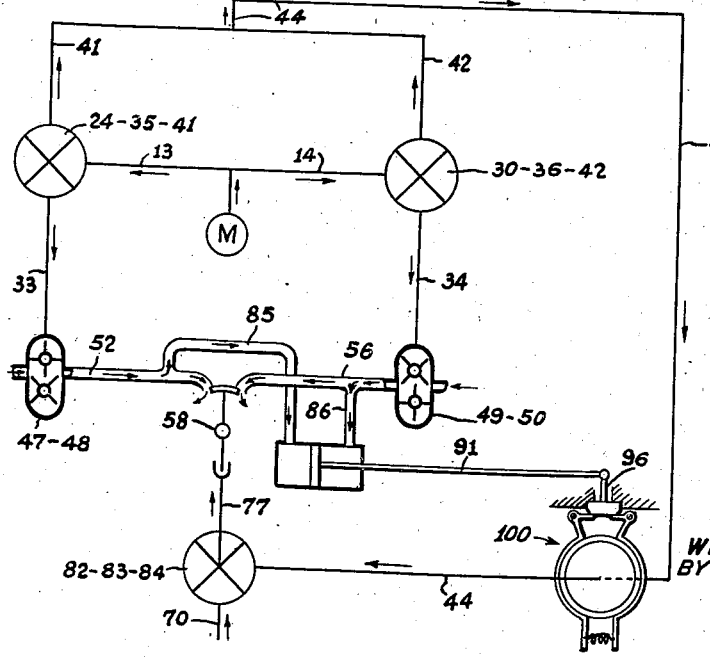
FIG. 1.
INVENTOR
WILLIAM A. BLACK
BY Moses & Nolte
ATTORNEYS July 15, 1941.  W. A. BLACK  2,248,942
POWER AMPLIFIER
Filed July 15, 1939  4 Sheets-Sheet 2

INVENTOR
WILLIAM A. BLACK
BY Moses & Nolte
ATTORNEYS

July 15, 1941.                W. A. BLACK                  2,248,942
                             POWER AMPLIFIER
                          Filed July 15, 1939          4 Sheets-Sheet 3

INVENTOR.
WILLIAM A. BLACK
BY Moser & Nolte
ATTORNEYS

July 15, 1941.   W. A. BLACK   2,248,942
POWER AMPLIFIER
Filed July 15, 1939   4 Sheets-Sheet 4

INVENTOR
WILLIAM A. BLACK
BY
ATTORNEYS

Patented July 15, 1941

2,248,942

UNITED STATES PATENT OFFICE 2,248,942

POWER AMPLIFIER

William A. Black, Montclair, N. J., assignor, by mesne assignments, to Reconstruction Finance Corporation, New York, N. Y., a corporation of the United States Application July 15, 1939, Serial No. 284,644

15 Claims. (Cl. 74—293)

This invention relates to a power amplifier comprising a relatively high power, rotary mechanism involving a high torque, a variably operated, low power, rotary mechanism capable of delivering only a relatively low torque, and mechanical means for causing the high power mechanism to conform in its operation to the operation of the low power mechanism.

By conformity of operation is meant the maintaining of a consistent relationship as to direction and speed of operation. The operation of the high torque mechanism may be maintained consistently in the same direction as the operation of the low torque mechanism, or consistently in the opposite direction. The speed of operation of the high torque mechanism may be maintained consistently the same as the speed of operation of the low torque mechanism, or consistently a multiple or a fraction thereof.

It is an object of the invention to provide means for compelling a high torque mechanism to conform in its operation with the operation of a low torque controller both as to direction of operation and speed of operation, and substantially as to phase of operation.

In accordance with a practical and advantageous embodiment of the invention, the high torque mechanism comprises a motor which operates uniformly in a single direction, and includes two differential trains equally responsive to the motor and connected in opposed relation to a common output shaft, so that either may predominate over the other in determining the direction and speed of rotation of the common output shaft.

Each differential comprises two outlets, one to the common output shaft, and the other to an oil pump which serves as a brake for that outlet. A common valve is provided for inversely controlling the outlets of the oil pumps, so that as the resistance to operation of one of the oil pumps is increased the other is diminished. The effect of increasing the resistance to operation of an oil pump is to cause the differential train, of which it forms a part, to effect an increased delivery of power for driving the common output shaft in one direction. Since the oil pump outlets are inversely controlled, an increase in the delivery of power by one of the differential trains is accompanied by a decrease in the delivery of power by the opposed differential train. The greater the difference between the resistances of the oil pumps the greater will be the power delivered to the common output shaft. When the load on the common output shaft is a dead load tending merely to oppose any rotation of the output shaft, and when the resistances of the oil pumps are in balance, the common output shaft will remain idle regardless of the magnitude of the dead load upon it, notwithstanding the fact that the driving motor continues to rotate at its normal speed. Similarly, when an extraneous torque is applied to the common output shaft, tending to rotate the shaft in either direction, and the difference of the resistances of the two oil pumps is sufficient to balance the dynamic load thus applied to the common output shaft, the latter will remain idle, notwithstanding the fact that the driving motor continues to rotate at its normal speed.

In the ensuing description the load will be assumed to be a dead load, except when otherwise stated.

An important feature of the invention has to do with the actuation of the valve under the joint control of the common output shaft of the high torque mechanism and the control shaft of a low torque controlling mechanism. To this end the control shaft of the low torque mechanism and the output shaft of the high torque mechanism have gears fast upon them which act in common upon an interposed pinion. The pinion is carried at the free end of a swinging arm, and the arm in turn is connected to rock the valve which acts upon the outlets of the oil pumps. When the two shafts are traveling at the same speed and in the same direction they have no tendency to move the pinion, and hence the pinion-carrying arm and the valve remain stationary. When both shafts are stationary, the pinion will stand stationary in the common axial plane of the shafts, the valve being maintained in the neutral or balanced position in which the resistances to the oil pumps are equal. If, now, the low torque shaft is rotated clockwise, the pinion will be carried with it in a clockwise direction and will thereby cause the valve to be shifted to unbalance the gear pumps in a direction to cause clockwise rotation of the high torque output shaft which will be accelerated until the two shafts are rotating substantially in unison. When the condition of rotation in unison occurs, the pinion and the valve will have assumed positions characteristic of clockwise rotation of the high torque shaft at the speed which has been imposed upon the low torque shaft, and will remain in that position until the speed of the low torque shaft is further modified.

Had the low torque shaft been started up in a counter-clockwise direction from a state of rest, the operation would have been the same as that just described above, save that the unbalance of the resistances to the oil pumps would have been in the opposite direction, and hence counter-clockwise rotation of the high torque output shaft would have been induced and the pinion and valve would have come to rest in the positions characteristic of counter-clockwise rotation of the high torque output shaft at the rate imposed upon the low torque shaft.

While the statements of the two preceding paragraphs correctly describe the mode of operation in many applications the fact is that the mechanism as thus far indicated would have a certain tendency toward over correction or limiting under certain operating conditions, namely, when required to drive large inertia loads at excessive speeds or when the angular displacement between the high torque output shaft and the low torque input shaft required to operate the valve is very small.

It is an important object of the present invention to reduce or avoid this hunting tendency by providing a stabilizing brake on the high torque output shaft and control means therefor which will prevent hunting.

To this end, it is an important feature of the invention that the back pressures of the oil pumps caused by the valve at the outlet sides of the pumps are opposed to one another through a pressure responsive member, and that the pressure responsive member is connected to maintain a brake inoperative at all times, when a substantial state of unbalance exists. Thus, when the lower power mechanism is started up from a state of rest with the high power input shaft rotating at normal speed, the back pressure at the outlet side of the pump whose outlet is obstructed to the greater degree will predominate over the back pressure of the other pump, the piston will be displaced from a neutral position, and will cause the brake to be released. As the high torque shaft gains in speed toward the speed of the low torque shaft, the oil pump subjected to the greater obstruction by the valve will be slowed down, and the oil pump subjected to the lesser obstruction will be speeded up.

Thus, the difference between the back pressures of the pumps is less when the speed of the high torque shaft is more nearly the same as the speed of the low torque shaft than when there is a substantial difference of speeds. As the speed of the high torque shaft approaches the speed of the low torque shaft therefore, the opposition of the pressure responsive member to application of the brake is diminished. Spring means is provided which tends constantly to urge the pressure responsive member to the neutral position where the brake will be applied. As soon as the difference of back pressures falls to a value insufficient to overcome the spring, the brake is applied by the spring so that over-correction is checked.

Other objects and advantages will hereinafter appear.

In the drawings which form part of this specification and which illustrates a practical and advantageous embodiment of the invention:

Variations of the mechanism referred to for illustrative purposes may be practiced within the scope of the invention, and parts of the improvements may be used without others.

Figure 1 is a diagrammatic view indicating the principle of operation of the illustrative mechanism;

Figure 6 is a vertical sectional view taken upon the line 6—6 of Figure 3 looking in the direction of the arrows.

Figure 4:
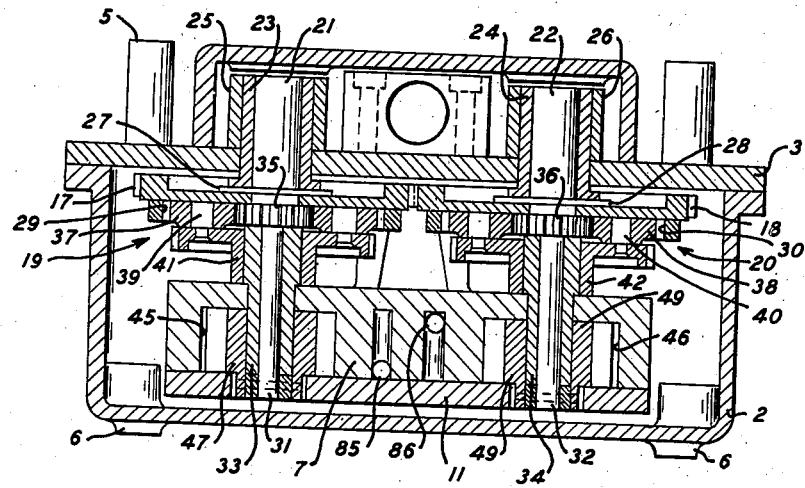
Figure 4 is a horizontal sectional view taken upon the line 4—4 of Figure 5 looking in the direction of the arrows.

The housing 1 for the power amplifier of torque converter comprises a cup-shaped casing member 2, a closure and mounting plate 3 secured thereto, and a forward, cup-shaped, brake housing member 4 secured to the plate 3. The plate 3 is provided with mounting studs 5 which are desirably formed integral with the plate. Four of these studs are illustrated (see Figures 2 and 4). The studs are formed with threaded bores into which bolts (not shown) may be threaded after the studs have been passed through openings in a suitable support. The housing member 2 is similarly equipped with bored and threaded mounting studs 6 (see Figures 3 and 4).

A block 7 is mounted within the casing formed by the members 2 and 3, this block being adapted to provide supports and bearings for certain of the shafts, and oil chambers and passages for confining and directing oil, all as will be made clear in the ensuing description. The block 7 includes three projections or bosses 8 which are formed with threaded bores 9 for securement to the mounting plate 3 by means of bolts 10. A closure plate 11 is secured to the rear face of the block 7 for closing certain oil passages and chambers in the block, the plate 11 having an opening 12 therethrough for permitting oil to pass through chambers and passages within the block outward into the casing 2—3.

The high power input mechanism comprises a constant speed motor M (Figure 1) which, through suitable transmission mechanism, drives two shafts 13 and 14 positively, in opposite directions, and at equal speeds. Pinions 15 and 16, Fig. 6, fast respectively, with the shafts 13 and 14, are in mesh, respectively, with gears 17 and 18 which constitute input members for differential units 19 and 20, Figs. 4 and 6. The gears 17 and 18 are rotatably mounted upon shafts 21 and 22. Shouldered bushings, 23 and 24, are mounted in the plate 3 providing bearings for the shafts 21 and 22. Flanges 27 and 28 are provided on shafts 21 and 22 for connecting the gears 17 and 18 to their respective shafts 21 and 22. Internal gears 29 and 30 are fixed, respectively, upon the gears 17 and 18 in coaxial relation thereto.

Shafts 31 and 32 are disposed in axial alignment, respectively, with the shafts 21 and 22. Sleeves 33 and 34 fast to block 7 provide bearings for the shafts 31 and 32, respectively. Sun gears 35 and 36 are made fast to the shafts 31 and 32, the gear 35 being disposed between the ends of the shaft 21 and the sleeve 33 (Fig. 4), and the gears 36 being disposed between the ends of the shaft 22 and the sleeve 34.

Figure 7:
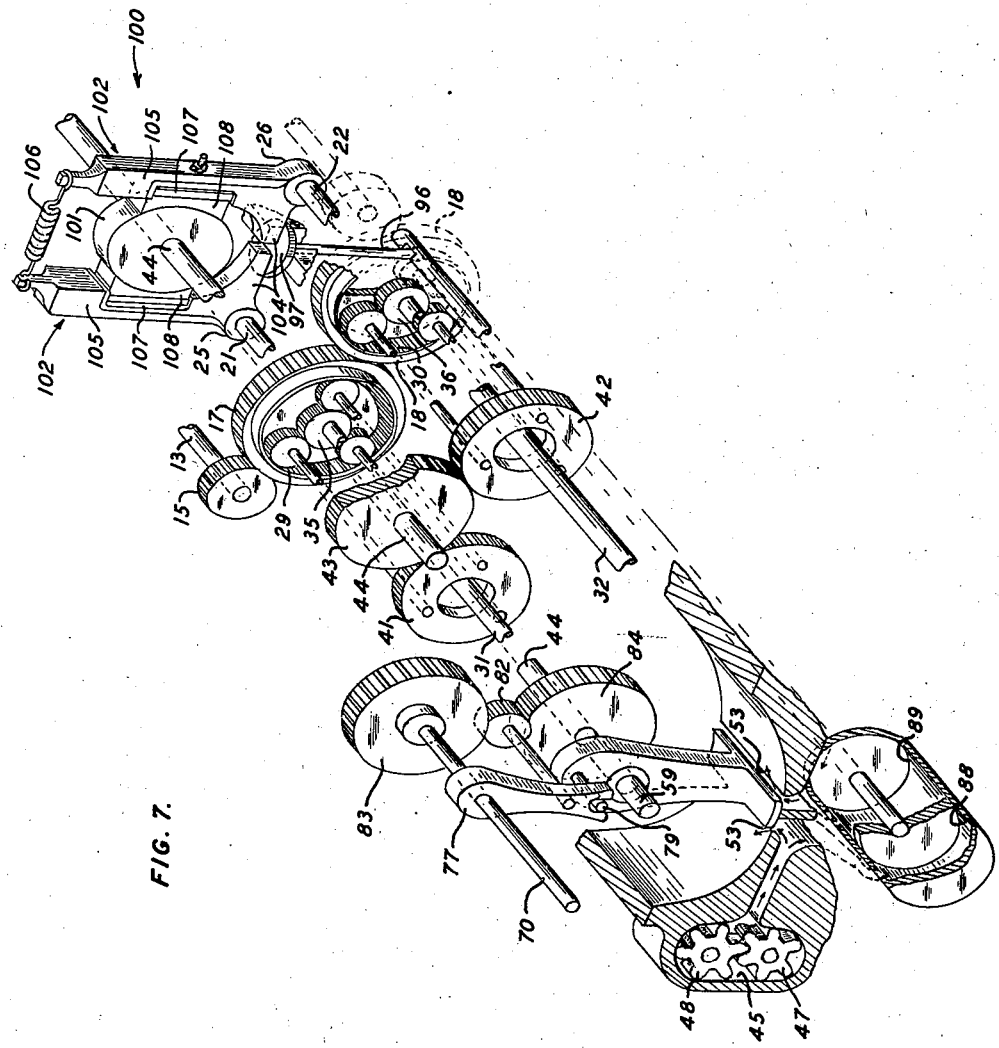
Figure 7 is a fragmentary, diagrammatic, perspective view showing the parts spread out axially for clearness of illustration.

Planetary pinions 37 and 38 are mounted by means of pivot studs 39 and 40 upon planet carrier gears 41 and 42, the carrier gears being journaled, respectively, upon the sleeves 33 and 34. As illustrated, three planetary pinions are provided in each instance, the pinions 37 having their axes equidistant from the axis of the shaft 31 and equally spaced from one another about the shaft. The disposition of the planetary pinions 38 with respect to the shaft 32 is the same. The planet carrier gears 41 and 42 are both in mesh with a common output gear 43 which is fast upon a common output shaft 44 (Figure 7).

The gears 17 and 18 are of equal size and are in mesh with one another so that input from either of the shafts 13 or 14 would compel the gears 17 and 18 always to turn at equal speeds, but in opposite directions. A plurality of input shafts 13 and 14 are provided, however, for the sake of improving balance and relieving strain.

From what has been said thus far, it will be apparent that the input to each differential unit is through its ring gear and that the power output to the power shaft 44 is through gear 43 from the planet carrier gears. While the gears 17 and 18 are compelled to rotate at equal speeds but in opposite directions, the planet carrier gears 41 and 42 (Fig. 4) cannot rotate otherwise than in unison with one another.

It is probably desirable at this point to analyze briefly the action of the differentials, on the assumption that no extraneous force tending to turn shaft 44 is applied. Gear 17, together with ring gear 29, is constantly driven at uniform speed in a clockwise direction, and gear 18, together with ring gear 30, is constantly driven at the same speed but in the opposite direction. If equal resistances are opposed to the rotation of the gears 35 and 36, these gears will rotate at equal speeds, and each in a direction opposite to that of its associated ring gear. There will then be no output through the planet carrier gears 41 and 42 to the shaft 44, regardless of the magnitude of the dead load on the shaft 44. If, however, the resistance to rotation of the gear 35 be increased, and the resistance to rotation of the gear 36 be at the same time diminished, the gear 35 will be retarded and will cause the planet carrier 41 to turn clockwise and to drive the gear 43 in a counter-clockwise direction. The gear 43 will, in turn, drive the planet carrier gear 42 in a clockwise direction, causing the speed of the sun gear 36 in a clockwise direction to be increased. This increased speed of the sun gear 36 is in harmony with the reduced resistance to the rotation of the sun gear.

If the resistances to the gears 35 and 36 are unbalanced in the opposite direction, the reverse condition will prevail and the shaft 44 will be driven clockwise. Mechanism is provided for adjusting the resistances to rotation of the gears 35 and 36 inversely, and in any proportion desired.

The block 7 is formed to provide a pair of gear pump chambers 45 and 46 (Figs. 4 and 5), the chamber 45 being entered by the rear ends of the shaft 31 and the sleeve 33, and the chamber 46 being entered by the rear ends of the shaft 32 and the sleeve 34. Gear 47 rotates on sleeve 33, which is affixed to block 7, and is driven by a pin connection on shaft 31. Gear 47 meshes with and drives a gear 48, both gears being located in the chamber 45. The gear 49 is similarly mounted on a sleeve 34, which is also affixed to block 7, and is similarly driven by a pin connection on shaft 32. Gear 49 meshes with and drives a gear 50, both gears being located in the chamber 46. The gears 47 and 48 constitute a gear pump for drawing oil into the chamber 45 from the casing 2—3 through an intake passage 51 and for discharging it under pressure through a passage 52 and a port 53 into a chamber 54, whence it flows back through the opening 12 of the plate 11 into the casing 2—3. Similarly the gear pump formed by the gears 49 and 50 draws in oil from the casing 2—3 through an intake passage 55 and delivers it under pressure through a passage 56 and a port 57 to the chamber 54, whence it flows back to the casing 2—3 through the opening 12 in the plate 11. A valve 58 is rockably mounted to control inversely the ports 53 and 57, and thereby to control inversely the resistances opposed, respectively, to the oil pumps 47—48 and 49—50.

The valve 58 (Fig. 5) is mounted in a lower chamber 73A and affixed to a shaft 59, the shaft being supported in ball bearings 60 and 61 and disposed in axial alignment with the high torque output shaft 44, and the ball bearings 60 and 61 being supported in bearing plates 60A and 61A, which are in turn mounted in the chamber 73A.

The mechanism for controlling the valve 58 constitutes an embodiment of a salient feature of the invention. A low torque control shaft 70 (which may be driven in either direction by any suitable means) enters the rear wall of the housing member 2 through a bushing 71 and passes through the plate 11 and a bearing plate 72 into an upper chamber 73 formed in the block 7, being journaled at its forward end in a bushing 74 which is mounted in the forward face of the block 7. The shaft 70 has a reduced portion 75 intermediate its ends. A bearing sleeve 76 is secured to the bearing plate 72. The sleeve surrounds the reduced portion 75 of the shaft 70, being spaced from the shaft but disposed in coaxial relation to the shaft. An arm 77 has its hub portion 78 journaled on the sleeve 76.

The arm 77 is bifurcated at its lower end to embrace a pin 79 which is affixed to the tail portion 80 of the valve 58. The arm 77 has affixed to it a bearing stud 81, upon which a pinion 82 is journaled. A gear 83 affixed to the shaft 70 meshes with the pinion 82 at all times. A gear 84 affixed upon the rear end of the shaft 44 is also adapted to mesh with the pinion 82 when the pinion is in the common axial plane of the shafts 70 and 44 or only a short distance to either side of that plane. Gears 83 and 84 may be of the same size, as illustrated when a one to one relation of shafts 44 and 70 is desired. The ratio may obviously be varied for particular applications, and the form of gearing may also be varied.

Figure 5:
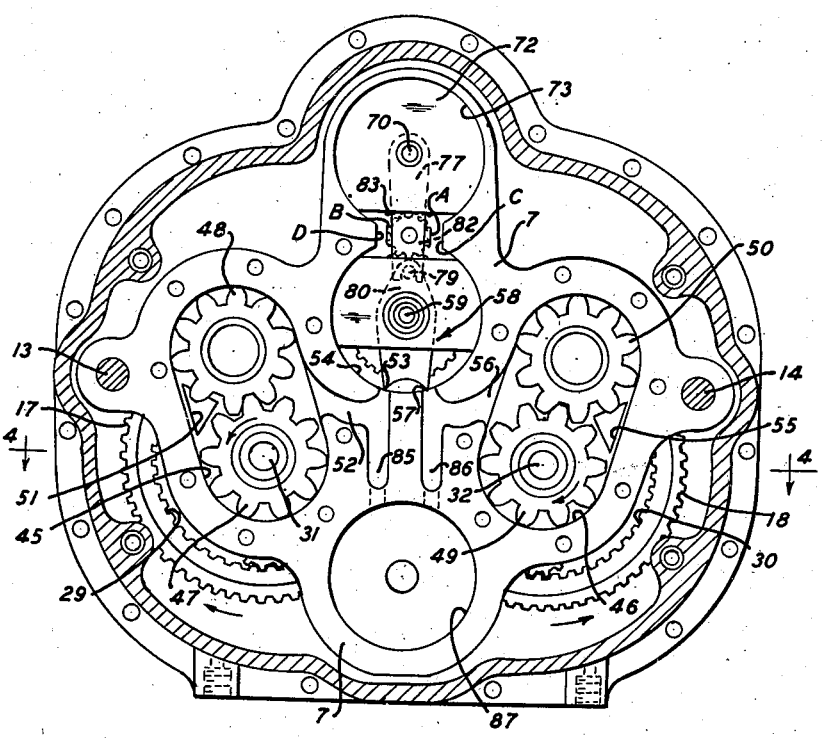
Figure 5 is a vertical sectional view taken upon the line 5—5 of Figure 3 looking in the direction of the arrows.

With the shafts 13 and 14 running, no dynamic load on the shaft 44, and the shaft 70 stationary, the resistances of the gear pumps will be balanced and the pinion 82 will lie in the common axial plane of the shafts 70 and 44 as illustrated in Figures 5 and 7. The gears 41 and 42 will tend equally to drive the gear 43 in opposite directions, but will balance one another and remain stationary. The gear 35 will run at the same peripheral speed as the gear 29, but in the opposite direction. The gear 36 will run at the same peripheral speed as the gear 30 but in the opposite direction. If, now, the shaft 70 is driven clockwise, as viewed in Figures 5 and 7, the pinion 82 will be driven toward the left by the gear 83 and will carry the lower end of the arm 77 toward the left. This swings the lower end of the valve 58 toward the right, increasing the obstruction of the port 57 and reducing the obstruction of the port 53. The sun gear 36 which was previously turning in the opposite direction to the ring gear 30, but at the same peripheral speed as the ring gear, will be retarded, and will cause the gear 42 to turn in the same direction as the ring gear 30. The gear 42 will act through the gear 43 to drive the gear 41 in unison with itself. This carries the planet gears 37 of gear 41 around in the direction opposite to that in which the ring gear 29 rotates uniformly, and hence causes the sun gear 35 and the gear pump 47—48 to be accelerated.

The movement of the pinion 82 (Fig. 3) toward the left is in an arcuate path about the axis of the shaft 70. Arm 77 has two projections A and B, aligned with shoulders C and D, respectively, of member 7. Pinion 82 is mounted on arm 77. The movement of arm 77 carrying pinion 82 is limited by the shoulders C and D, the projection A on arm 77 striking shoulder C in one extreme position, and the projection B striking shoulder D in the other extreme position. This limitation of movement of arm 77 serves a double purpose which is to prevent the pinion 82 from running out of mesh and to prevent the valve 58 from exceeding the desired limitations of travel. The extreme position, however, would tend to produce the maximum speed of rotation of the shaft 44 in one direction, whereas it may be assumed, for the purpose of the present discussion, that the speed at which the shaft 70 is being turned is less than the maximum. When the shaft 44 has attained the speed of the shaft 70, there will be no longer any impulse to carry the pinion 82 toward the left, and if the shaft 44 slightly exceeds the speed of the shaft 70, the pinion will move back toward the common axial plane of the shafts 70 and 44. This movement will affect the position of the valve 58, and while there may be some slight overcorrection, any shifting of the pinion beyond the position appropriate for operation of the shafts 70 and 44 in unison will tend to slow down the shaft 44 below the speed of the shaft 70. Obviously, a condition will soon be attained in which the two shafts 70 and 44 rotate in unison, and the pinion takes up a stationary position harmonious with that speed, the position assumed being dependent upon the magnitude of the load on shaft 44. Any subsequent change of speed of the shaft 70 will react in a similar manner upon the pinion 82 and upon the valve 58 so that the described mechansm is automatically effective to induce the shaft 44 to assume the direction and speed of rotation of the shaft 70 up to the maximum output of the machine as determined by the input of the motor M. One limit occurs when the sun gear 35 is brought substantially to rest by the resistance of the valve 58 to the discharge of oil by the gear pump 47—48. The other limit occurs when the sun gear 36 is brought substantially to rest by the resistance of the valve 58 to discharge of oil by the gear pump 49—50.

Reverting once more to the condition in which the shafts 70 and 44 are stationary with no dynamic external load applied to the shaft 44, if now an external load is applied to shaft 44 tending to rotate it in a counterclockwise direction, it will begin a movement in that direction carrying with it the gear 84. This will start a movement of pinion 82 and arm 77 to the left causing the valve to move to the right. This action will continue until the resistance of the right-hand pump so predominates over that of the left-hand pump that a clockwise torque is set up in the output shaft 44 which just balances the counter-clockwise load on shaft 44. If now shaft 70 is turned clockwise, pinion 82 and arm 77 will be moved further to the left causing the valve to be moved further to the right. This will cause the clockwise output torque of shaft 44 to predominate over the external counter-clockwise load on shaft 44, thereby producing clockwise rotation. Rotation of shaft 44 will continue until balance is restored between output torque and load resistance.

It has been mentioned that the mechanism as thus far described may be subject to over-correction or hunting. The present invention comprehends mechanism for minimizing this hunting action.

The passages 52 and 56 which lead from the gear pumps 47—48 and 49—50, respectively, communicate through passages 85 and 86 with the opposite ends of a cylinder 87 formed in the lower portion of the block 7. A piston 88 (Fig. 3) divides the cylinder 87 into two chambers 89 and 90. A piston rod 91 fast with the piston 88 is slidably mounted in a boss 92 of the block 7, and extends forward through a stuffing box 93 into the housing member 4. The piston rod 91 is provided with an open socket 94 in its forward end for receiving the ball-shaped end 95 of a rocking lever 96. The rocking lever 96 is formed with a headed portion 97 which is convex on the top and flat on the bottom. The shank of the lever 96 extends through a supporting plate 98 which is affixed to the plate 3. The flat lower face of the head 97 rests in a circular recess formed at the upper side of the plate 98. Movement of the piston 88 in a forward direction tilts the lever 96 about the rearmost portion of the edge of the head 97, while movement of the piston toward the rear tilts the lever 96 about the foremost portion of the edge of the head 97. Either movement is effective to raise a portion of the head and thereby to release brake mechanism 100 which acts upon the shaft 44. In other words, the brake mechanism is ineffective at all times, save when the piston 88, the piston rod 91 and the lever 96 are in substantially the positions illustrated in Figure 3.

The brake 100 operates upon a drum 101 which is fast upon the output shaft 44. The brake mechanism comprises two bell crank levers 102 (Figures 2 and 7) which are mounted at their pivotal hub portions 25 and 26 on the bushings 23 and 24, Figs. 2 and 4. Each of the bell crank levers 102 (Figs. 3 and 7) comprises a lower arm 104 which rests upon the head 97 of the rocking lever 96 and upper arms 105 which are disposed at opposite sides of the brake drum 101. A tension spring 106 connected to the upper ends of the arms 105 draws the arms toward one another. Each of the arms 105 has a brake adjustment bolt 109 threaded through its central portion and secured in place by a lock nut 110. Each of the bolts 109 has a reduced tip portion 113 at its inner end. Each of the arms 105 carries a brake shoe retainer 107 and a brake shoe 108, the brake shoes being disposed to bear against the surface of the drum 101. The brake shoe retainers 107 are provided with center holes 112 into which the tips 113 of the associated bolt 109 are inserted. The brake shoes 108 may thus be individually adjusted so that they both operate and release substantially simultaneously.

Figures 2, 3:
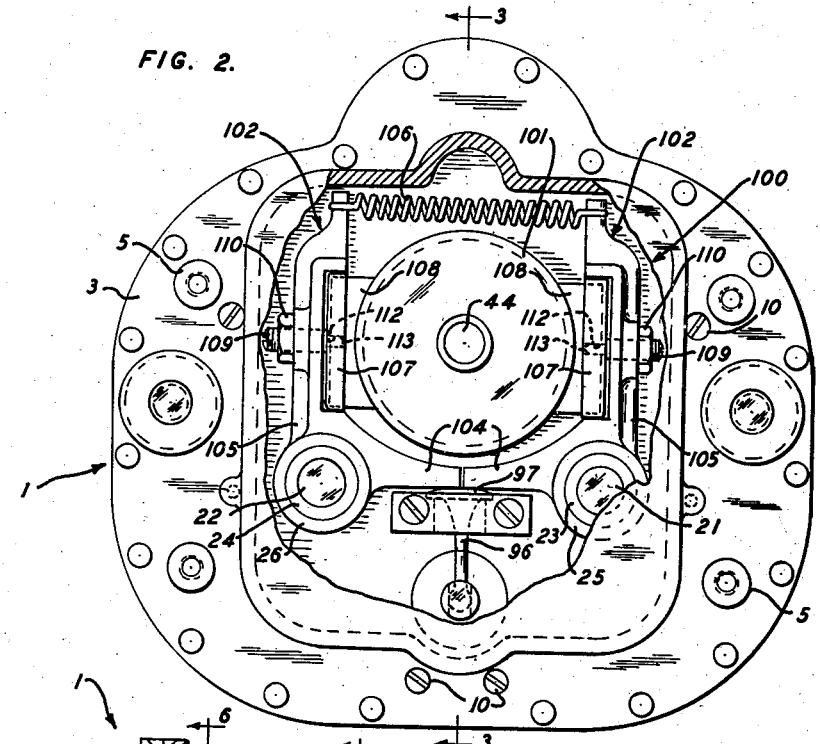
Figure 2 is a view in front elevation of the power amplifier with the front cover or brake housing member removed.
Figure 3 is a vertical, sectional view taken upon the line 3—3 of Figure 2 looking in the direction of the arrows.

When the shafts 13 and 14 are operating at uniform speed and the shaft 70 is stationary, the piston may be assumed to be in the position illustrated in Figure 3. If, now, the shaft 70 is turned clockwise, inertia produced by the load of shaft 44 will oppose instantaneous changes of speed of the pumps 47—48 and 49—50. Such turning of the shaft 70 will cause the obstruction of the port 57 to be increased and that of the port 53 to be reduced, the immediate effect being to increase substantially the back pressure at the delivery side of oil pump 49—50, and to reduce substantially the back pressure at the delivery side of the oil pump 47—48. This immediately results in a substantial unbalance of the oil pressures at the opposite sides of the piston 88 and causes the piston 88 to be forced to the right (Fig. 3). This movement of the piston 88 away from the position of Figure 3 causes the brake shoes to reduce their pressure on the drum 101 so that the brake is made ineffective and is maintained ineffective until the piston is returned substantially to the position of Figure 3. Such return of the piston cannot occur so long as the shaft 44 has not caught up with the shaft 70 in speed, or has merely caught up without over-running. If the gear 84 attains a peripheral speed in excess of the gear 83, however, and maintains such excess of speed for an appreciable time, the valve 58 will be quickly returned toward or through its central position. This will quickly cause the unbalance of oil pressures at opposite sides of the piston 88 to be reversed so that the brake will be applied to the drum 101 to assist in reducing the speed of the shaft 44. If the shafts 70 and 44 have been running in unison and the shaft 70 is stopped, the brake will assist in stopping the shaft 44.

While the action has been described as if the adjustment of the shaft 44 to the speed of the shaft 70 occurred gradually, in actual practice there is not necessarily anything gradual about the action. By making the available power output of the motor M large in relation to the load on shaft 44, the shaft 44 can be made instantaneously to follow abrupt changes of speed of shaft 70, the correspondence being so close, in fact, that shafts 70 and 44 never differ in phase by more than a very few degrees.

The mechanism is accurately responsive to the speed of the control shaft 70, and remains so even though variations occur in operating conditions, such as changed oil viscosity caused by temperature, changed clearances of parts caused by wear, etc. Neither will the correct operation be adversely affected by manufacturing variations confined within reasonable and comfortable tolerances. These advantages are secured by balancing one oil resistance against another, and by making the output speed dependent upon the rotary speed of the control member. The mechanism will always find the correct position for correspondence of speeds.

I have described what I believe to be the best embodiments of my invention. I do not wish, however, to be confined to the embodiments shown, but what I desire to cover by Letters Patent is set forth in the appended claims.

I claim:

1. A power amplifier comprising, in combination, a high torque mechanism including high power input means and an output shaft, a low torque control shaft for applying an extraneously imposed speed and direction of rotation, and hydraulic means comprising trains interposed between the high power input means and the output shaft and differentially responsive to the difference of rotation of said shafts to compel the high torque output shaft to conform to the speed and direction of rotation of the control shaft.

2. A power amplifier comprising, in combination, a high torque mechanism including high power input means and a high torque output shaft, a low torque control shaft for applying an extraneously imposed speed and direction of rotation, a control member, means differentially connecting said shafts to the control member, and hydraulic means comprising trains interposed between the high power input means and the output shaft and differentially responsive to the control member for compelling the high torque output shaft to conform to the speed and direction of rotation of the low torque control shaft.

3. A power amplifier comprising, in combination, a high torque mechanism including high power input means, a high torque output shaft, and opposed power transmitting trains constantly connecting the input means and the output shaft, a low torque control shaft for applying an extraneously imposed speed of rotation, and hydraulic control means under the joint influence of said shafts for determining the relative effects of the opposed trains upon the high torque output shaft.

4. A power amplifier comprising, in combination, a high torque mechanism including high power input means, a high torque output shaft, and opposed power transmitting trains constantly connecting the input means and the output shaft, each train including a differential gear having an input gear connected to the input means, a power output gear connected to the output shaft, and a second output gear, and a breaking means for opposing rotation of the second output gear, and means for inversely controlling the braking means of the two trains.

5. A power amplifier comprising, in combination, a high torque mechanism including high power input means, an output shaft, and opposed power transmitting trains constantly connecting the power input means and the output shaft, each train including a differential gear having an input gear connected to the power input means, a power output gear connected to the output shaft, and a second output gear, and a braking means for opposing rotation of the second output gear, means for inversely controlling the braking means of the two trains comprising a brake controlling member common to the braking means of the two trains; a low torque control shaft, and means differentially controlled by the high power output shaft and low power control shaft for operating the common brake control member.

6. A power amplifier as set forth in claim 5 in which the braking means for the second output gears of the power transmitting trains consists of two fluid pumps, and the brake controlling means comprises a valve operable to obstruct the outlets of the two pumps in various ratios.

7. A power amplifier as set forth in claim 4 in which the differential input gears are positively connected to the high power input means for rotation at equal speeds and in opposite directions, and in which the power output gears of the two differentials are so connected to the power output shaft that they are compelled to rotate in unison.

8. In a power controlled mechanism, in combination, a pair of rotary shafts, gears fixed on the respective shafts, an arm pivoted coaxially with one of the shafts, a pinion carried by the arm between the gears for engagement with both of them, and braking means for affecting the rotation of the other of said shafts, said braking means being operated by the movement of said arm.

9. A power amplifier comprising, in combination, a high torque mechanism including high power input means, an output shaft, and opposed power transmitting trains constantly connecting the input means with the output shaft, each train including a differential gear having an input gear connected to the input means, a power output gear connected to the output shaft, a second output gear, and a fluid pump operated by the second output gear, a low torque control shaft, control means differentially responsive to the rotation of the shafts for obstructing in inverse relation the outlets of said pumps, and for controlling back pressure at the outlet side of each, a pair of fluid chambers communicating with the outlets of the respective pumps, pressure responsive means interposed between said chambers, a stabilizing brake for acting upon the high power output shaft, and means operated by the pressure responsive means for controlling the brake.

10. A power amplifier comprising, in combination, a high torque mechanism including high power input means, an output shaft, and opposed power transmitting trains constantly connecting the input means with the output shaft, each train including a differential gear having an input gear connected to the input means, a power output gear connected to the output shaft, a second output gear, and a fluid pump operated by the second output gear, a low torque control means differentially responsive to the rotation of the shafts for obstructing in inverse relation the outlets of said pumps, and for developing a back pressure at the outlet side of one or both of them, a pair of fluid chambers communicating with the outlets of the respective pumps, pressure responsive means interposed between said chambers, a stabilizing brake for acting upon the high power output shaft, and means operated by the pressure responsive means for maintaining the brake ineffective whenever the fluid pressures in the two chambers are substantially out of balance but for causing the brake to be applied when the fluid pressures in the two chambers are substantially equal.

11. A power amplifier comprising, in combination, a high torque mechanism including high power input means and an output shaft, a low torque control shaft, control means differentially responsive to the rotations of the output shaft and the control shaft for causing the output shaft to assume the speed and direction of rotation of the low torque control shaft, a stabilizing brake for acting upon the high power output shaft, and means responsive to said control means for causing the brake to be applied when the high power shaft is rotating faster than in conformity with the low power control shaft, but to be ineffective at other times.

12. A power amplifier comprising, in combination, a high torque mechanism including high power input means, an output shaft, and opposed power transmitting trains constantly connecting the input means with the output shaft, each train including a differential gear having an input gear connected to the input means, a power output gear connected to the output shaft, a second output gear, and a fluid pump operated by the second output gear, a low torque control shaft, and control means differentially responsive to the rotation of the shafts for obstructing in inverse relation the outlets of said pumps, and for controlling back pressure at the outlet side of each.

13. In a power amplifier, in combination, a high torque input shaft, an output shaft adapted to be driven thereby, means providing opposed hydraulic slip drives between the high torque input shaft and the output shaft, a low torque control shaft, and means responsive to the difference of operation of the low torque control shaft and the output shaft for inversely controlling the slip of said slip drives so that one becomes progressively more positive as the other becomes progressively less so, and vice versa.

14. In a power amplifier, in combination, a high torque input shaft, an output shaft adapted to be driven thereby, means providing opposed hydraulic slip drives between the high torque input shaft and the output shaft, a low torque control shaft, and means responsive to the difference of operation of the low torque control shaft and the output shaft for inversely controlling the relative positiveness of the two slip drives in accordance with the phase relation of the output shaft to the low power control shaft.

15. A power amplifier comprising, in combination, a high torque mechanism including high power input means, a high torque output shaft, and opposed power transmitting trains connecting the input means and the output shaft, each train including an input gear connected to the input means, a power output gear connected to the output shaft, and hydraulic slip drive means for controlling the effect of the input gear on the power output gear, said input gears being positively connected to the high power input means for operation at equal speeds in opposite directions, and said output gears being positively connected to the power output shaft for rotation in unison, and means for inversely controlling slip of the hydraulic means of the two trains so that one becomes progressively more positive as the other becomes progressively less so, and vice versa.

WILLIAM A. BLACK.